Oct. 4, 1955
N. S. DODGE, JR., ET AL
2,719,752
HOSE RACK
Filed March 26, 1953
3 Sheets-Sheet 1
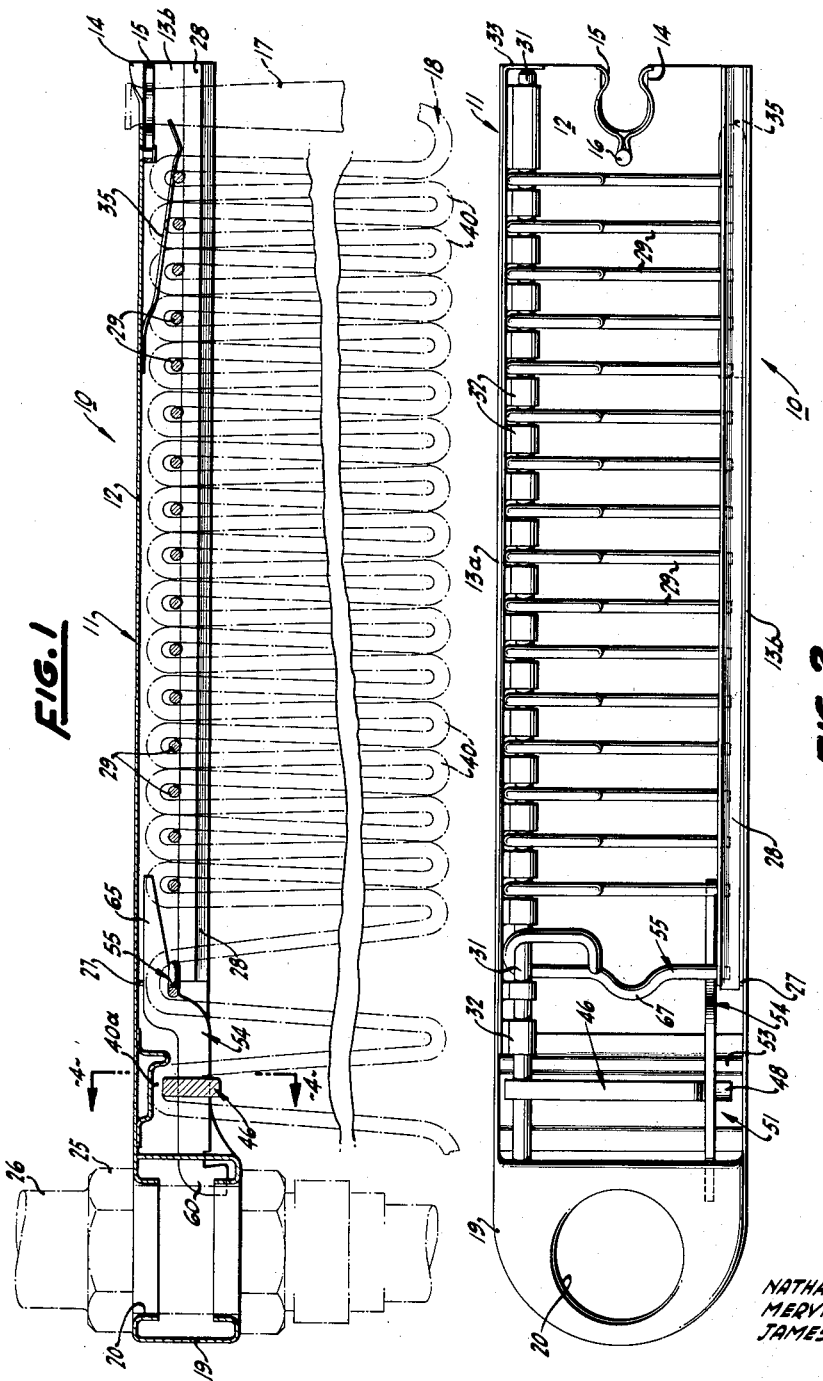
NATHANIEL S. DODGE, JR.
MERVIN E. NEGLEY
JAMES A. SANFORD
INVENTORS
BY Henry Gifford Hardy
Attorney.

Oct. 4, 1955    N. S. DODGE, JR., ET AL    2,719,752
HOSE RACK

Filed March 26, 1953    3 Sheets-Sheet 2

NATHANIEL S. DODGE, JR.
MERVIN E. NEGLEY
JAMES A. SANFORD
INVENTORS

BY *Henry Gifford Hardy*
    *Attorney*

Oct. 4, 1955 — N. S. DODGE, JR., ET AL — 2,719,752
HOSE RACK
Filed March 26, 1953 — 3 Sheets-Sheet 3
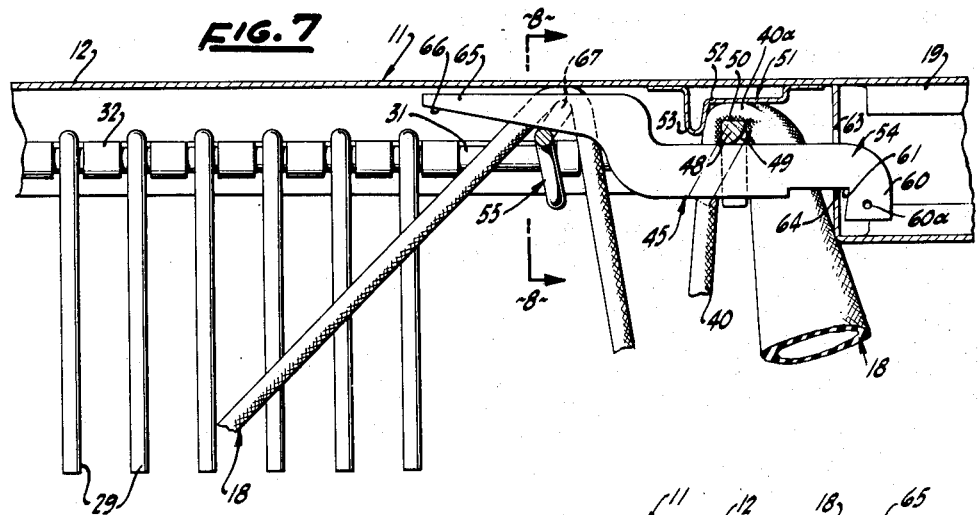
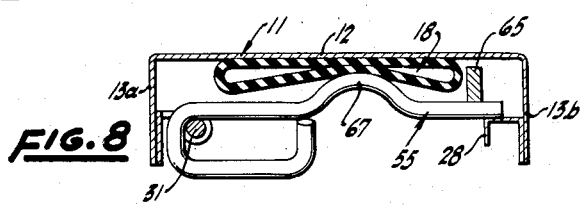
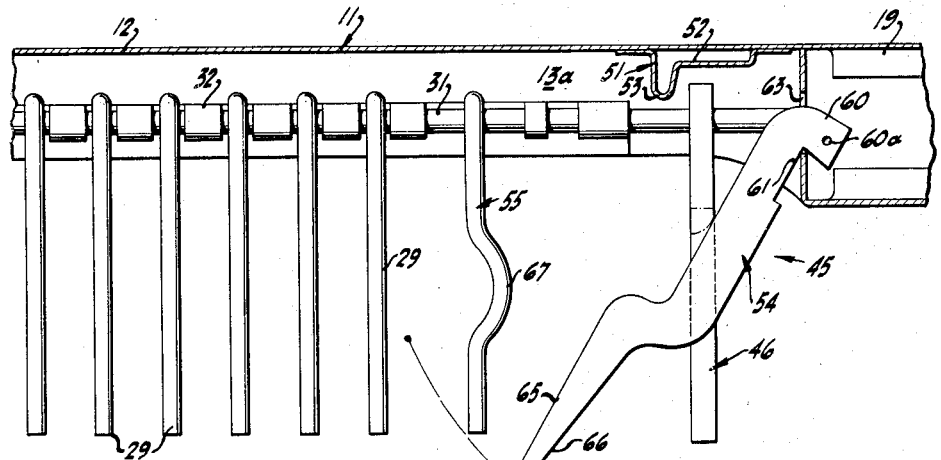
NATHANIEL S. DODGE, JR.
MERVIN E. NEGLEY
JAMES A. SANFORD
INVENTORS

United States Patent Office 2,719,752
Patented Oct. 4, 1955

2,719,752
HOSE RACK

Nathaniel S. Dodge, Jr., Orinda, Mervin E. Negley, Oakland, and James A. Sanford, Berkeley, Calif., assignors to The American Rubber Manufacturing Co., Oakland, Calif., a corporation of California Application March 26, 1953, Serial No. 344,828

3 Claims. (Cl. 299—77)

This invention relates to a hose rack for supporting a fire hose in condition for immediate emergency use. More particularly, it relates to a semi-automatic rack in which the water may be turned on before the hose is laid out, for supporting a fire hose in vertical folds, which is intended for installation and convenient locations in buildings for use by those untrained in the handling of fire streams in the event of fire.

Hose racks of this general character, and particularly those referred to herein, are provided with a hood or arm which is mounted on the stand pipe so as to swing freely through a wide arc in the direction of pull and which has a series of releasable pins or links for supporting a hose in the vertical folds or festoons. The purpose of this is, that when the nozzle or play pipe is released for use, the hose is pulled off of the pins in sequence and one fold at a time, as the hose is laid to the place of use. It is essential that each fold shall be released without it or its supporting link binding or catching on the rack, or permitting the hose to fall into a tangled mass.

Hose racks of this character should support the hose in loops or folds so as to present a neat, compact appearance. It is essential that the hose should lie or bend in natural folds so that sharp bending or creasing, which would injure the hose, will be avoided.

It is a requirement of semi-automatic devices of this character that the water may be turned on at the main valve before the hose is laid out, and retain the water in the first three loops of hose hung on the rack withstanding a pressure of 150 p. s. i., without releasing any of the hose on the rack or the nozzle, while at the same time, permitting easy operation with no binding or kinking of the hose. Semi-automatic hose racks are intended for emergency operation when there is only one person available. In devices of this character such person should be able to open the main valve admitting water to the hose at full pressure, then grasp the nozzle or play pipe and detach it from its holder, and lay the hose to the site of the fire, without any flow of water through the hose until the entire length of hose (which is usually 50 to 100 feet) has been laid out. If the one person were required to lay out the hose, then return to the stand pipe and open the valve, and then return to the nozzle discharging water without direction, much valuable time would be lost when it is needed most and property would be needlessly damaged by water. It is obvious that if the valve is opened first and the water is allowed to flow through the hose before it has been fully detached or released from the rack, swelling of the hose due to the water pressure may cause it to bind in the rack and thereby interfere with, or even prevent removal of the hose in the emergency.

Heretofore, in the recognition of these objectives, various attempts have been made to secure a hose on a rack of the semi-automatic type, in which the operator could first turn on the water valve, lay out the hose up to the last three or four loops, and then by a quick pull on the hose itself, not only release the remaining folds from the rack, but at the same time, allow the water to flow through the full length of hose from the valve at full pressure. However, the attempts of the earlier devices to attain these objectives have not been able to confine the water to the first two or three loops, or if a successful means for holding the water was provided, it was impossible to release the last fold unerringly so as to permit the full flow of water. In short, the successful attainment of these two features have seemed mutually exclusive.

It is an object of the present invention to provide a hose rack of the general character and for the general purpose described which is superior to hose racks used heretofore, and which successfully meets the required objectives.

Another object of the invention is to provide an improved clamping means to prevent the flow of water into a hose beyond the first fold until all but the last two folds of the hose has been detached from its rack and laid.

Yet another object of the invention is to provide a clamping means for a hose rack for the purpose described, which effectively and dependably shuts off the flow of water without itself becoming jammed, until the hose has been laid and the user is ready for the full flow of water at full pressure.

Still another object of the invention is to provide a dependable clamping means of the character and for the purpose described which will withstand a relatively high water pressure, e. g., 100 lbs. p. s. i., for a relatively long period of time, yet which is easily and rapidly unlatched remotely when the hose ahead of it has been laid, so as to permit flow of water through the hose to the nozzle or play pipe.

Another object of the invention is to provide a hose rack of the character and for the purpose described which is relatively simple in construction but permits all of the holding and locking means for the entire length of hose to fall free by positive action, thus eliminating the possibility of their binding or catching in the rack, fouling or tangling the hose.

Another object is to provide a pressure retainer link assembly for semi-automatic hose racks which is unfailingly releasable with only a moderate pull.

A still further object is to provide a semi-automatic hose rack which will meet and successfully pass all of the severe Underwriters' Laboratories specifications, not only as to design but of construction and operation .

Further objects are to provide a construction of maximum simplicity, economy and ease of assembly and disassembly; also such further objects, advantages and capabilities as will fully appear and as are inherently possessed by the device and the invention described herein.

The invention further resides in the combination, construction and arrangement of parts illustrated in the accompanying drawings, and while there is shown therein a preferred embodiment thereof, it is to be understood that the same is merely illustrative of the invention and that the invention is capable of modification and change and comprehends other details of construction without departing from the spirit thereof or the scope of the appended claims.

Referring to the drawings:

Figure 1 is a longitudinal vertical section of the hose rack of the present invention showing the manner of mounting on the stand pipe and supporting the hose, both of which are in phantom lines.

Figure 2 is a bottom plan view of the hose rack of Figure 1, shown without the hose.

4—4 of Figure 1, showing the pressure holding link in normal operative position, and its inoperative position in broken lines.

Figure 4:
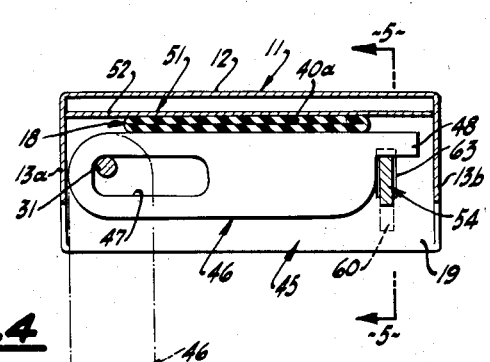
Figure 4 is a transverse section taken along the line
Figure 5:
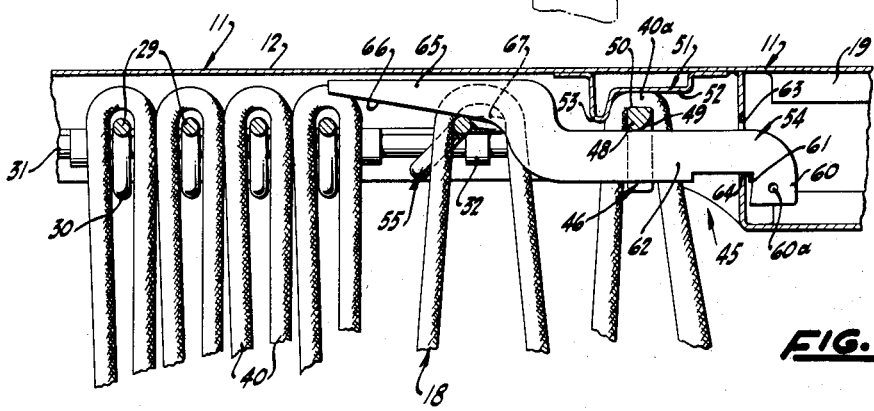

Figure 5 is a fragmentary, longitudinal section which is taken along the line 5—5 of Figure 4 looking in the direction of the arrows and which shows the clamping means of the present invention in operative position.

Figure 6:
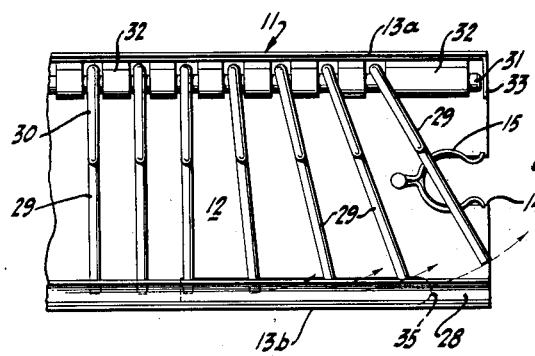

Figure 6 is a fragmentary bottom view. The view is identical with that shown in Figure 2 except that it shows only the outer end of the rack and the sequential operation of the hose supporting links.

Figure 7 is a fragmentary longitudinal section similar to that of Figure 5 but showing the hose released from the rack except the last two folds.

Figure 8 is a transverse section taken along the line 8—8 of Figure 7.

Figure 9 is a view similar to that of Figure 7 but showing the hose rack with the hose completely released therefrom.

With reference to the drawings in which similar parts are designated by identical numerals, and more particularly to Figures 1 and 2, the hose rack of the present invention is generally designated as 10. It comprises a protective hood 11 which is channel-shaped, is constructed of sheet steel or other suitable material, and has a transverse body or web 12 with depending sides 13a and 13b. At its outer end, i. e., to the right as viewed in Figures 1 and 2, the hood 11 is cut away to provide a substantially U-shaped opening 14. In registry therewith there is provided a U-shaped spring clip 15 which is secured to the hood by means of a rivet 16. The clip 15 is intended to hold the nozzle or play pipe 17 of a hose 18 firmly when in the inoperative position shown but to easily release the same when a pull or jerk is applied to the nozzle.

At its inner end, i. e., to the left as viewed in Figures 1 and 2, the hood 11 is formed with a base 19, preferably hollow, formed with a circular hole 20 which, as shown in Figure 1, is intended to receive a pipe fitting with a bearing nut 25 above and below, on the stand pipe 25. The rack 10 may be mounted on any type of outlet or even a wall. It may be mounted with a wall bracket or pipe clamp, or it may be supported from the valve itself with a valve nipple. As shown in Figure 1, it is mounted by means of the base 19, the hole 20 and the fittings 25 above and below on a stand pipe 26 which carries the water supply for the hose under suitable pressure. The standpipe 26 is provided with the conventional shut-off valve, not shown, to which the coupling of the hose 18, not shown, is attached. The base 19 is free to rotate in a horizontal plane between the upper and lower fittings 25 and is capable of swinging through a wide arc to follow the direction of pull on the hose as it is laid.

Figure 3:
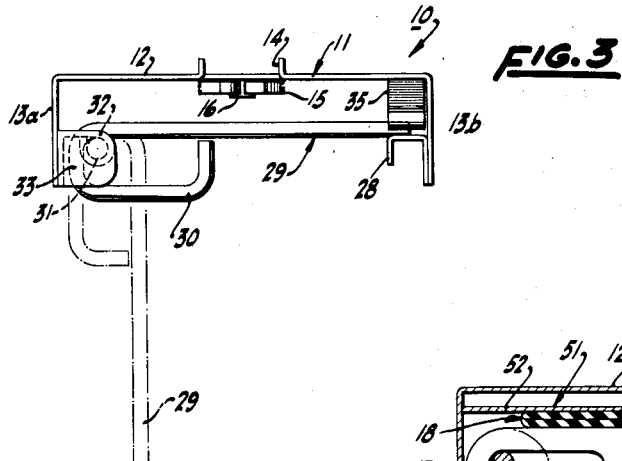
Figure 3 is a front end elevational view as seen from the right of Figure 1.

Referring to the same Figures 1 and 2 and with further reference to Figure 3, a channel member 28 is secured to the side portion 13b of the hood and extends longitudinally thereof from the outer end to the stop 27. The back of the channel 28 provides a ledge for supporting the free ends of links or pins 29 when in operative position. The other ends of the links 29 which extend for nearly the full width of the hood, are formed with loops 30 which are slidably and rotatably mounted on a rod 31. The rod 31, as is most clearly shown in Figure 2, is supported by tubular spacers 32 which are welded or otherwise suitably secured to the opposite side portion 13a of the hood 11. The rod 31 is slidable through the spacers 32 and the loops 30 of the links 29 but its accidental removal is prevented by means of a tab 33 formed at the outer end of the side portion 13a of hood 11 in registry with the rod 31. The spacers 32 serve to separate the several retaining links 29 while permitting them free rotation on the rod 31. As is most clearly shown in Figure 1, a retainer 35 is provided in the form of a leaf spring which is held at its inner end to the hood. This retainer 35 provides spring resistance and serves to prevent accidental or inadvertent dislodgement of the first two or three of the links 29, but it does not prevent their dislodgement in the intended manner as explained hereinafter.

As is best shown in Figure 1, the empty, flattened hose 18 is folded or looped over the retaining links 29 in the form of vertical loops or festoons 40, one link for each upper loop. In this manner 50' or 100' of hose may be stored neatly and with a minimum of space. In operation, and apart from the clamping means described hereinafter, when it is desired to use the hose, the standpipe valve (not shown) is opened. This immediately fills the hose with water under pressure up to point 40a causing it to swell. Meanwhile, the clamping means prevents flow of water into the hose beyond a point 40a indicated in Figure 1, leaving the remaining portion unchanged. The nozzle or play pipe 17 is grasped by hand and pulled free of the spring clip 15. The operator then walks or runs with the nozzle and, as partially illustrated in Figure 6, the resulting pull on the hose as it is being laid causes each of the links 29 to swing outwardly in succession so that their free ends are removed from the support of the back of channel 28. As each link is denied the support on channel 28, it will drop to the vertical position shown in Figures 3, 7 and 9. There is no danger of the links 29 becoming lost or misplaced. They are precisely spaced on the rod 31 and cannot be removed unless the rack is intentionally taken apart. In laying the hose the disengagement of each link 29 frees the loop 40 which it supports, thus paying out the hose one loop at a time. The balance of each link permits it to fall to the vertical position so that it cannot become jammed or entangled with the hose.

It is essential, during the laying of the hose with the valve open, that the hose be clamped firmly adjacent the base 19 to prevent flow of water into the remainder of the hose so as to permit the maximum length of hose being laid before the water is permitted to reach the nozzle. To this end, a clamping means is provided which is most clearly shown in Figures 4, 5 and 7 to 9. Referring particularly to Figures 4 and 5, the clamping means is generally designated as 45. A pressure holding link 46 is provided in the form of a relatively thick metal bar having a slot 47 formed therein adjacent one end substantially similar to the loop of the links 29, by which it is slidably and rotatably mounted and retained on the rod 31. At its opposite end, i. e., at its right hand end as viewed in Figure 4, the pressure holding link 46 is formed with a finger 48. As shown in Figure 5, the finger 48 is rounded at 49 and is squared at 50. This rounding of the finger 48 permits the same radius of contact regardless of the cant of link 46. The link 46 co-operates with a pressure holding plate 51 which is secured as an integral step under the web of hood 11. The pressure holding plate 51 is in registry with the upper edge of link 46, has a flat surface 52 and an adjoining downwardly tapered projecting rib 53 which is transverse of the hood 11.

The pressure holding device 45 also includes a pressure retaining link lock bar 54 and a specially designed, hose-supporting and clamping link 55. The lock bar 54 has a downwardly projecting lug 60 at its inner end which is formed with a hole 60a for mounting it for pivotal movement within the base 19. The latch bar 54 is also formed with a notch 61 adjacent the lug 60 in its body portion 62. In use, as illustrated in Figure 5, it is intended that the lock bar 54 extend through the slot 63 formed in the base 19 of the hood, with the lug 60 disposed within the base. The notch permits the lock bar 54 to swing to a vertical position on release, on the pivot for hole 60a and clear the lower position of the base 60. The lock bar 54 is formed with a forwardly projecting finger 65, the lower edge of which tapers upwardly and forwardly to provide a cam surface 66.

The special clamping link 55, as is most clearly shown in Figure 8, is identical with the links 29 except in one important respect. Thus, the link 55 is formed with a bend or hump 67 at its mid-portion, which is biased rearwardly.

The operative position of the pressure holding means for the semi-automatic rack is shown in Figure 5. In this position, the pressure holding link 46 is in the horizontal position shown in the full lines in Figure 4. The first upper loop of the hose 18 is wedged between the upper surface 50 of the link 46 and the pressure holding plate 51. The link 46 is moved forwardly so that the fold of the hose also abuts against the tapered rib 53. The finger 48 rests upon the upper surface of the body portion 62 of the pressure retaining link lock 54. The second upper fold of the hose 18 passes between the inner surface of the hood 11 and the special holding link 55 so that the hump or bend 67 bears against a central portion thereof. As in the case of the other links 29, special link 55 rests its free end on the channel member 28 as shown in Figure 8. The free end of the special link 55 also engages the cam surface 66 so that as the link is moved rearwardly, a wedging action occurs so that the locking bar 54 is firmly held in an operative position. It is to be noted that the spacers 32 for the special link 55 are wider apart than for the other links to provide more longitudinal movement. It will be observed that when the first upper fold of the hose is in the position shown in Figure 5, it will be wedged between the upper surface of the pressure holding link 46 and the pressure holding plate 51 so that at point 40a no leaking of water occurs. To further make certain no leaking occurs beyond this point, there is also a wedging action of the upper fold of the hose between the tapered rib 53 and the upper portion of the pressure holding link 46. These pressures and wedging actions are further increased by the additional squeeze from the underside by the link lock 54 through the action of the special link 55 on the cam surface 66. Thus, in three separate ways, force is exerted on the hose to make sure that there is no flow of water of any kind beyond point 40a, even though the water pressure from the valve to this point is greater than that ordinarily encountered in water pressure systems of this kind.

As hereinbefore stated, when it becomes necessary to use the hose on this rack, the water is turned on at the valve and immediately the hose fills with water up to the point 40a. In changing from a flat section to a filled round section, the hose exerts a pressure on the rearward side of pressure holding link 46, causing its lower edge to cant forward and rock on the curved surface 49 of the finger 48 to a position substantially that shown in phantom lines in Figure 7. This further tends to provide a fourth pressure or wedging action, preventing flow beyond this link, and provide a seal. With the water turned on, the user then releases the nozzle or play pipe 17 and proceeds to lay the hose by pulling on the hose itself. This causes the outer pins 29 to swing in a horizontal arc shown in Figure 6. As soon as its free end is removed from the support of the channel back 28, it then swings to the vertical position shown in Figure 3, permitting the fold of the hose, which it supported, to fall free. The first two links 29 must overcome the resistance of the spring finger 35 as has also been previously mentioned. The fact that these links are spaced means that only one fold at a time is released, and these in proper sequence, so that there is neither any jamming of the links themselves in the rack or any possibility of having the hose kink or tangle.

The links 29, one after the other, drop to the vertical position shown in Figure 7 until there are only two remaining loops, that held by the special link 55 and the first loop held by the pressure holding link 46. When the line of the hose reaches this point, there is additional resistance to the release of the link 55. This is overcome by a moderate tug on the laid hose by the person at the nozzle, which tug causes the hose loop and special link to move forwardly on the rod 31. As the free end of the link 55 moves along forwardly along the upwardly inclined cam surface 66, the hump 67 rolls forwardly maintaining the pressure at the central portion as shown in Figure 8. This, however, is only momentary, for as soon as the link 55 is moved far enough so that its free end is not only forward of its earlier position but is denied the support of the channel member 28, it will immediately drop to the vertical position shown in Figure 9. The dropping of the special link 55 leaves the lock bar 54 without support and pivoting on the pivot through the hole 60a, it swings to the vertical position, not only allowing the fold previously supported by link 55 to fall, but releasing the heavy supporting link 46, which, in turn, falls to the vertical position shown in Figure 9. In this manner, all of the holding elements are automatically released and swing to a vertical position completely free of any possible fouling of the hose and completely free of any interference with the flow of water to the nozzle or play pipe.

When it is desired, after use of the hose, to restore it to the condition shown in Figure 1, the water valve is, of course, closed and the hose is drained of water and is smoothed out to assume a substantially flat configuration. The portion of the hose near the base 19 of the rack is folded to make the first fold. The pressure holding link 46 is then raised and rotated to the horizontal position shown in Figure 4 with the fold over and supported by this link. It is moved forward as far as possible toward the rib 53. The lock bar 54 is lifted to the horizontal position illustrated in Figure 5 so its upper edge supports the finger 48 of the pressure holding link. While holding the link lock in this position a second fold is made in the hose. This second fold is placed over the special link 55 and its free end is then restored to rest on the channel member 28 in the position shown in Figure 8. The special link is then pushed rearwardly against the cam surface 66 of lock bar 54. This will firmly wedge the lock bar 54 in the position shown in Figure 5 and it will effectively restore the water pressure clamping means 45 of the rack, to its operative condition. As illustrated in Figure 5, the remaining length of hose is then folded, one fold at a time to produce as many folds or loops as there are links 29. Each link is inserted within the appropriate fold and the links are restored to their horizontal positions with their free ends supported by the channel 28 as illustrated in Figure 3.

It will be understood that all of these re-assembling operations are carried out individually and in the proper sequence, first, the water pressure clamping means is restored as above described, next a length or segment of hose is folded, the appropriate link 29 inserted in the resulting fold or loop and the link then lifted and rotated to support its free end on the channel 28. Thereafter, another loop is formed in the hose, the next link inserted in the loop, etc., until the entire length of hose is supported in the manner illustrated in Figure 1. Finally, the nozzle 17 will be pressed into the spring clamp 15 and, if desired, the hood 11 will be rotated to a position in which it is out of the way. For example, if the rack is housed in a box or in a recess in a wall, the rack will be rotated to a position within such box or recess.

It will, therefore, be apparent that a semi-automatic hose rack has been provided for supporting a length of hose or the like in a compact condition ready for instant use when the need arises, and that such device embodies a pressure holding means to effectively cut off and prevent the flow of water through the hose until almost the entire length of hose has been laid. This clamping means is simple in construction, and will automatically unlatch to release the remaining length of hose, to relieve the clamping pressure and to allow flow of water to the nozzle or play pipe, remotely by a moderate tug on the hose at the nozzle. This clamping means is extremely effective and will not allow flow of water beyond the pressure holding link. In the entire rack all of the supporting means for the hose fall clear of the hose in sequence, even the clamping means, removing the possibility of binding or wedging of the links or fouling the hose itself.

It will be further observed that in the release of the water pressure clamping means 45 there is no pull on the locking bar 54 or the pressure retaining link 46. Thus there is no possibility of distortion or twisting which could cause trouble or failure in an emergency. The pull required for releasing is on the special link 55 which is not subject to water pressure or swelling at the time. Other than the little added resistance caused by the hump 67, there are no more obstacles in the release of the second fold than are present in the release of the other links 29. Each of the links 29 is individually separated and subject only to a limited longitudinal movement. Because of the spacers, pulling of the hose 18 does not pull them any closer together or tend to bunch them, all of which might cause fouling and failure to release properly.

We claim:

1. In a semi-automatic hose rack comprising a hood having a base and an outer end, and a plurality of hose supporting links carried by said hood for supporting a hose in a series of vertical loops or folds and for releasing such loops in sequence when an outward pull is exerted on the hose, the improvement which comprises clamping means to prevent the flow of water through said hose adjacent said base including a pressure retaining link supported at one end for swinging in a vertical plane transverse to said hood, a plate under the hood in registry with said retaining link having a tapered transverse rib limiting the longitudinal movement of said pressure link, locking means having a cam finger and a body for supporting the other end of said retaining link in hose-supporting and clamping position within the first fold or loop of said hose, a special link having a median hump therein within the second fold or loop wedging said loop against the hood member supported at one end for swinging in a limited horizontal plane to disengage the free end and then dropping to a vertical position, the free end of which engages the said cam finger of the locking means when supporting the second loop of hose, said special link being movable horizontally by a remote pull on the hose to disengage its free end, instantaneously release said locking means and remove the support for the pressure retaining link, permitting complete release of the last two folds of hose.

2. In a semi-automatic hose rack comprising a hood having a base and an outer end, a plurality of links for supporting a succession of vertical loops of hose, means individually supporting said links at one end for swinging in a vertical inoperative position and also in a horizontal plane, a ledge for supporting the other ends of said links in a horizontal plane with a single loop of hose supported on each but allowing swinging thereof outwardly to release the links and thereby drop the loops of hose in succession, the improvement which comprises clamping means for clamping such hose adjacent said base to prevent flow of water through the hose, said clamping means comprising cooperable clamping members adjacent said base including a pressure retaining link supported similarly to said links and adapted to support the first loop of hose, a plate under the hood in registry with said retaining link having a tapered transverse rib limiting the longitudinal movement of said pressure link and cooperating therewith to squeeze said hose therebetween, a lever for support and applying pressure to said pressure retaining link beneath the said first loop and having a projecting finger with a cam surface thereon, and a special link having a hump therein supported similarly to said links, supporting the second fold of said hose and wedging the hose against said hood requiring an additional moderate tug to dislodge it and its supported loop, the free end of which is adapted to engage said cam surface so that when a moderate additional tug is given the second fold is not only freed but simultaneously the first fold is relieved of support releasing the fold and permitting water to flow through the entire length of hose.

3. A semi-automatic hose rack as in claim 2 including a pressure retaining link having a quarter rounded finger for cooperating with said lever.

References Cited in the file of this patent

UNITED STATES PATENTS

| 890,652 | Howard | June 16, 1908 |
| 1,156,706 | Nuhring | Oct. 12, 1915 |
| 1,177,316 | Gibbs | Mar. 28, 1916 |
| 1,658,793 | Hansen | Feb. 14, 1928 |